United States Patent Office 3,042,719
Patented July 3, 1962

3,042,719
N-ACETYL AMINOPHENOL PROCESS
John H. Hahn, Mehlville, and John F. Quinn, Kirkwood, Mo., assignors to Monsanto Chemical Company, St. Louis, Mo., a corporation of Delaware
No Drawing. Filed Feb. 29, 1960, Ser. No. 11,500
17 Claims. (Cl. 260—562)

This invention pertains to a process for purifying crude N-acetyl aminophenolic compounds and more specifically pertains to a process for purifying N-acetyl aminophenolic compounds obtained from a crude aminophenol containing oxidation products thereof, so that the purified N-acetyl aminophenol compounds are suitable for pharmaceutical purposes.

Crude N-acetyl aminophenolic compounds vary in their impurity content from a product which is light gray in color to one which is blue-black. Such products result from the acetylation of aminophenolic compounds of various degrees of purity. It is well known, as reported in U.S. Patent No. 2,013,394, that aminophenols, and especially ortho and para aminophenols, oxidize readily to give quinone, quinonimine and meri-quinonimine impurities which impart discoloration to the aminophenol. Hence these color bodies or their derivatives are present in crude N-acetyl aminophenol products prepared by reacting a crude discolored aminophenol with an acetylating agent such as acetic anhydride, mixtures of acetic anhydride and acetic acid, acetic acid, etc. Obviously, then, where the N-acetyl aminophenolic compounds are to be used for medicinal purposes or where they are to be used as intermediates in the preparation of other compounds having medicinal uses, the crude N-acetyl aminophenol product must be purified to remove colored as well as non-colored impurities.

It has now been discovered that crude N-acetyl aminophenolic compounds, that is a mixture containing an N-acetyl aminophenol obtained from crude discolored aminophenol containing oxidation products of the aminophenol, can be purified by carrying out in a non-oxidizing atmosphere the steps of dissolving the impure N-acetyl aminophenolic compound in water, acidifying the aqueous solution with a mineral acid, filtering the solution, which is at a temperature of from about 50° C. to about 100° C., and cooling the filtrate while adding thereto an alkaline reducing sulfite as the N-acetyl aminophenolic compound crystallizes from the solution. The process of this invention can be carried out with excellent results being obtained by using carbon dioxide, nitrogen or hydrogen to provide the non-oxidizing atmosphere and treating the aqueous solution prepared with sulfur dioxide prior to the filtration step, or sulfur dioxide can be used to provide the non-oxidizing atmosphere, in which case a small amount of sulfur dioxide is absorbed prior to the filtration step through surface absorption when the hot solution is agitated. A still further embodiment of the process of this invention comprises adding decolorizing carbon to the hot (about 50° C. to 100° C.) aqueous solution of the crude N-acetyl aminophenol, holding the acidic solution at a temperature of 50° C. to 100° C., preferably at 85° C. to 95° C., for a short while, filtering the hot acidic solution and then cooling the filtrate to 10° to 0° C. to recrystallize the N-acetyl aminophenolic compound while adding an alkaline reducing agent to the solution during cooling.

By following the process of this invention as described above, generally a product of sufficient purity can be obtained. However, when particularly impure N-acetyl aminophenolic compounds are being purified by this process, it is often found desirable to subject the N-acetyl aminophenolic compound to a second recrystallizing step. If such a second recrystallization is found to be necessary, it will be found to be advantageous to redissolve the product from the first recrystallization in water, preferably a minimum amount of water, acidify the resulting aqueous solution and treat the acidic aqueous solution with an acidic reducing agent such as sulfur dioxide while heating this solution (to make sure that all the N-acetyl aminophenol is in solution), filtering the hot acidic solution, and then adding an alkaline reducing agent to this solution while cooling to recrystallize the N-acetyl aminophenolic compound therefrom. This second recrystallization step can also be carried out in the presence of a non-oxidizing atmosphere especially when the product from the first recrystallization step contains colored impurities or when it appears that colored impurities form during exposure of the recrystallized product to air. Otherwise, the second recrystallization process can be carried out in the absence of a non-oxidizing atmosphere.

Any mineral acid can be employed to acidify the aqueous solutions according to the process of this invention. However, mineral acids providing oxidizing conditions are undesirable since additional reducing materials must be supplied. It is for this reason that non-oxidizing mineral acids are preferred as the acidifying means.

More specifically, the most preferred process of this invention comprises carrying out in a non-oxidizing atmosphere provided by sulfur dioxide the steps of dissolving a crude N-acetyl aminophenolic compound in water, acidifying the resulting solution to a pH of from about 1 to about 2 with a non-oxidizing mineral acid such as sulfuric acid or hydrochloric acid, dissolving a small amount of sulfur dioxide in said solution, filtering the solution which is at a temperature of from 50° to 100° C. and cooling the filtrate until the N-acetyl aminophenol begins to crystallize and continuing the cooling while an alkaline reducing sulfite is added to the filtrate as the crystalline product forms. When a second purification step is required because of the highly impure nature of the starting crude N-acetyl aminophenolic compound, the most preferred second recrystallization comprises redissolving the product from the first recrystallization in a minimum amount of hot water, adding to the solution an alkaline reducing sulfite if necessary to provide an aqueous solution having a pH not above 7 and preferably between about 5 and 7, and then cooling the resulting aqueous solution to a temperature of about 5° C. and preferably adding an alkaline reducing sulfite as the crystallization of the N-acetyl aminophenol takes place. In general, the second recrystallization step, as described above, is used where the N-acetyl aminophenol itself is to be used for pharmaceutical purposes. The second step need not be employed where the product is to be used as an intermediate in the preparation of other compounds useful for pharmaceutical purposes.

Alkaline reducing sulfites useful in the process of this invention are the ammonium and alkali-metal sulfites such as the sulfites, bisulfites and hydrosulfites. The alkaline reducing sulfites can be introduced by forming them in situ in the purification or recovery steps by adding sulfurous acid or $SO_2$ to the aqueous medium to which has been added such alkaline materials as ammonium, potassium and sodium carbonates, bicarbonate or hydroxides.

N-acetyl aminophenolic compounds which can be purified by the process of this invention include the N-acetyl aminophenol as well as N-acetyl amino carvacrol, N-acetyl amino thymol, N-acetyl 2,5-dimethyl-4-aminophenol, N-acetyl 2-methyl-4-aminophenol, N-acetyl 3-methyl-4-aminophenol, N-acetyl 2,5-diethyl-4-aminophenol, N-acetyl-3-butyl-4-aminophenol and other N-acetyl alkyl substituted aminophenols containing lower alkyl nuclear substituents, i.e. having from one to four carbon atoms.

The process of this invention is particularly useful for the purification of N-acetyl aminophenols in which the amino group is in a position ortho or para to the hydroxy group (i.e. other than meta with respect to each other).

The following specific examples in which the term "parts" is employed to indicate parts by weight are given to illustrate the process of this invention.

Example I

There is dissolved in about 1450 parts of water in a closed reaction vessel previously provided with an atmosphere of sulfur dioxide, about 680 parts (4.50 moles) of crude almost black p(N-acetyl) aminophenol obtained by the reaction of acetic anhydride with crude p-aminophenol containing oxidation products of p-aminophenol. The resulting solution is heated and sufficient 66° Bé. sulfuric acid is added with stirring to adjust the pH to about 1.5. The resulting mixture is agitated with Darco G–60 for a short time and then filtered while hot. The filtrate is collected in a closed vessel provided with a non-oxidizing atmosphere of $SO_2$. The filter cake is discarded. The filtrate is cooled and a dilute aqueous solution of sodium hydrosulfite is added slowly beginning when p(N-acetyl) aminophenol begins to crystallize from the solution and continued until substantially all the product has been crystallized or until a temperature between 0 and 10° C. has been reached, a total of about 2 grams of sodium hydrosulfite is used during the crystallization step. The resulting cold slurry is then filtered in open atmosphere.

The resulting filter cake is white and the product is suitable for use as an intermediate in the synthesis of other medicinals. However, for this product per se to be used as a pharmaceutical, it is washed with about 170 parts of cold water at about 5° C. containing about 0.3 part of sodium hydrosulfite. The resulting washed cake is slurried with about 2000 parts of water and then heated to about 90° C. until all of the product is in solution. As a temperature of about 45° C. is reached, a sufficient quantity of sodium sulfite is added to adjust the pH of the solution to between 6 and 7. After all the product is in solution, the hot solution is cooled again to about 0° to 10° C to permit recrystallization of the product. The resulting slurry is filtered, the wet crystalline product is dried. The resulting dried product has a melting point of 169.4° to 170.1° C. and the spectrophotometric assay indicates that this product contains at least 99.4% p(N-acetyl) aminophenol. The color of a solution of this product containing 1 part of the product dissolved in 50 parts of water compares with an A.P.H.A. No. of 15. This product is satisfactory for pharmaceutical purposes.

Example II

The process of Example I is repeated except that carbon dioxide is employed as the non-oxidizing atmosphere and the reaction medium is acidified with hydrochloric acid and a small amount (about 0.5% by weight based on the N-acetyl aminophenol present) of $SO_2$ is added thereto. A yield of p(N-acetyl) aminophenol comparable in quality and quantity to that obtained in Example I is achieved.

Example III

The process of Example II is repeated except that nitrogen is employed as the non-oxidizing atmosphere. A yield of p(N-acetyl) aminophenol comparable in quality and quantity to that obtained in Example I is achieved.

Example IV

About 150 parts of crude dark colored N-acetyl p-amino thymol prepared from the reaction of acetic anhydride with crude amino thymol containing oxidation products thereof are dissolved in 2000 parts of hot (50° C.) water in a closed reaction vessel provided with an atmosphere of carbon dioxide. There is added to the resulting solution concentrated hydrochloric acid (37% HCl) to adjust the pH of the solution to about 1.5 to 2.0. The acidified solution is heated to about 95° C. and stirred with decolorizing charcoal for a few minutes and filtered while hot. The hot filtrate is collected in a closed vessel containing $SO_2$ and kept hot, about 85°–90° C., while bubbling in $SO_2$ at the bottom of the liquid for about 10 minutes. Thereafter the filtrate is cooled slowly to 5° to 10° C. and an aqueous solution of ammonium sulfite is added slowly when crystals form and is continuously added slowly until crystals no longer form. The resulting cold slurry is filtered to recover substantially pure N-acetyl p-amino thymol.

Example V

The procedure of Example I is repeated except that an equivalent amount of a crude p(N-acetyl) aminophenol obtained by the reaction of p-aminophenol with a mixture of acetic anhydride and acetic acid is substituted for the crude p(N-acetyl) aminophenol of said example. The product, p(N-acetyl) aminophenol, is obtained which is comparable in quality and quantity to that obtained in Example I.

Example VI

The procedure of Example I is repeated except that an equivalent amount of a crude p(N-acetyl) aminophenol obtained by reacting acetic acid with p-aminophenol is substituted for the crude p(N-acetyl) aminophenol of said example, and an atmosphere of carbon dioxide is employed in the second recrystallization step. The product, p(N-acetyl) aminophenol, is obtained which is comparable in quality and quantity to that obtained in Example I.

Example VII

Fifty parts of crude discolored p(N-acetyl) aminophenol obtained by the reaction of acetic anhydride with crude p-aminophenol, are added to a closed reaction vessel containing 190 parts of water and an atmosphere of sulfur dioxide. The resulting solution is heated and sufficient 66° Bé. sulfuric acid is added with stirring to adjust the pH to about 1.5. The resulting mixture is agitated with Darco G–60 charcoal for a short time and then filtered while hot. The filtrate is collected in a closed vessel provided with an atmosphere of sulfur dioxide. The filtrate is cooled and a dilute aqueous solution of sodium hydrosulfite is added slowly (dropwise) when the p(N-acetyl) aminophenol begins to crystallize and continued until substantially all of the product has crystallized at a temperature within the range of 5° C.– 10° C. A total of 0.15 part of sodium hydrosulfite is used. The resulting cold slurry is then filtered in the open atmosphere. The resulting filter cake is white and remains white when left open to the atmosphere. This product has a color in solution (1 part in 50 parts of $H_2O$) that compares with an A.P.H.A. No. of 15.

In contrast to this, when the sodium hydrosulfite is added all at once to the hot acidic solution, a filter cake is obtained which is medium blue in color and becomes progressively darker when left open to the atmosphere. A solution of the dried product (1 part in 50 parts of water) is light blue in color.

By operating according to the process of this invention, there is produced a purified N-acetyl aminophenol which is substantially pure white in color and which has an excellent shelf life. As evidenced by the results obtained in Example VII above, a color stable product is obtained by keeping the filtrate decolorized during the crystallization of the N-acetyl aminophenol, i.e. by the slow addition of a small amount of an alkaline reducing sulfite; whereas a product which is not color stable is obtained when the alkaline reducing sulfite is added all at once.

The amount of alkaline reducing sulfite required will depend then upon the purity of the crude N-acetyl aminophenol. Generally, amounts within the range of 0.05 to 2.0 parts per 100 parts of N-acetyl aminophenol are sufficient to keep the filtrate decolorized during the crystallization.

The amount of sulfur dioxide which is dissolved in the hot acidic solution may vary within wide ranges depending upon the degree of purity of the crude N-acetyl aminophenol, usually amounts within the range of 0.05 to 1 part per 100 parts of crude N-acetyl aminophenol provide satisfactory results, however higher amounts can be used without deleterious effects.

As hereinbefore state, the process described above in detail is applicable to the purification of N-acetyl derivatives of other aminophenols such as amino carvacrol, amino cresols, amino xylols, amino diethyl phenols and other aminophenols having as nuclear substituents other than the amino group and the hydroxy group only lower alkyl groups, that is alkyl groups containing 1 to 4 carbon atoms.

Many of the specific conditions can be varied as desired. For example, heating the aqueous medium containing the N-acetyl aminophenol need not be carried out at a temperature of precisely 90° C., however, in general, a temperature in excess of 90° C. may be employed, but it is not advisable to exceed about 100° C. Temperatures below 90° C. but above about 50° C. can be employed, however, greater volumes of water must be employed to insure complete solution of this N-acetyl derivative. Likewise, the crystallizing temperature can be varied within the temperature range of about 0° C. to about 10° C. Other obvious equivalent modifications of the process of this invention will be apparent to those skilled in the art.

This application is a continuation-in-part of application Serial Number 605,219, filed August 20, 1956, now abandoned, which in turn is a continuation of application Serial Number 478,865, filed December 30, 1954, now abandoned.

The embodiments of the invention in which an exclusive property or privilege is claimed are defined as follows:

1. In the process for the purification of a crude discolored N-acetyl aminophenol selected from the group consisting of N-acetyl aminophenol and lower alkyl substituted N-acetyl aminophenols containing as impurities products of oxidation of corresponding aminophenol the steps which comprise acidifying an aqueous solution of said crude N-acetyl aminophenol to a pH of from about 1 to about 5 with a mineral acid, filtering the solution which is at a temperature of from about 50° C. to about 100° C. and cooling the filtrate while slowly adding thereto at least about 0.05 part per 100 parts of N-acetyl aminophenol of an alkaline reducing sulfite as the N-acetyl aminophenol crystallizes from the solution, the foregoing steps being carried out in a non-oxidizing atmosphere.

2. The process of claim 1 wherein the non-oxidizing atmosphere is provided by sulfur dioxide.

3. In the process for the purification of crude discolored N-acetyl aminophenol in which the amino and hydroxyl groups are in position other than meta with respect to each other, obtained by reacting acetic anhydride with impure aminophenol containing as impurities products of oxidation of the aminophenol, the steps which comprise dissolving said crude discolored N-acetyl aminophenol in water, acidifying the aqueous solution to a pH of from about 1 to about 5 with a non-oxidizing mineral acid, heating the acidic solution to a temperature of from 50° C. to 100° C., dissolving a small amount, at least about 0.05 part per 100 parts of N-acetyl aminophenol, of sulfur dioxide in said solution, filtering the hot acidic solution and slowly cooling the filtrate while slowly adding thereto at least about 0.05 part per 100 parts of N-acetyl aminophenol of an alkaline reducing sulfite as the N-acetyl aminophenol crystallizes from the solution, the foregoing steps being carried out in an inert atmosphere.

4. In the process for the purification of crude discolored N-acetyl aminophenol in which the amino and hydroxyl groups are in position other than meta with respect to each other, obtained by reacting acetic anhydride with impure aminophenol containing as impurities products of oxidation of the aminophenol, the steps which comprise dissolving said crude discolored N-acetylphenol in water, acidifying the aqueous solution to a pH of from about 1 to about 5 with a non-oxidizing mineral acid, heating the acidic solution to a temperature of 50 to 100° C., filtering the hot acidic solution and slowly cooling the filtrate while slowly adding thereto at least about 0.05 part per 100 parts of N-acetyl aminophenol of an alkaline reducing sulfite as the N-acetyl aminophenol crystallizes from the solution, the foregoing steps being carried out in an atmosphere of sulfur dioxide.

5. The process of claim 4 wherein the alkaline reducing sulfite is sodium hydrosulfite.

6. The process of claim 5 wherein decolorizing carbon is added prior to the filtration step and wherein the acidic solution is at a temperature from 85° C. to 95° C.

7. The process of claim 3 wherein the non-oxidizing atmosphere is provided by carbon dioxide.

8. The process of claim 3 wherein the non-oxidizing atmosphere is provided by nitrogen.

9. In the process for the purification of crude discolored N-acetyl aminophenol, having the amino and hydroxyl groups in position other than meta with respect to each other, obtained by reacting acetic anhydride with impure aminophenol containing products of oxidation of the aminophenol; the steps which comprise dissolving said crude N-acetyl aminophenol in water, acidifying the aqueous solution with sulfuric acid to a pH of from 1 to 2, heating the acidic solution to a temperature of from 85° C. to 95° C., dissolving a small amount, at least about 0.05 part per 100 parts by weight of N-acetyl aminophenol, of sulfur dioxide in said solution, filtering the hot acidic solution and slowly cooling the filtrate to a temperature of from about 0° C. to about 10° C. while slowly adding thereto at least about 0.05 part per 100 parts by weight of N-acetyl aminophenol of sodium hydrosulfite as the N-acetyl aminophenol crystallizes from the solution, the foregoing steps being carried out in a non-oxidizing atmosphere.

10. The process of claim 9 wherein the N-acetyl aminophenol is p(N-acetyl) aminophenol.

11. The process of claim 10 wherein the non-oxidizing atmosphere is provided by carbon dioxide.

12. In the process for the purification of crude discolored N-acetyl aminophenol, having the amino and hydroxyl groups in position other than meta with respect to each other, obtained by reacting acetic anhydride with impure aminophenol containing products of oxidation of the aminophenol; the steps which comprise dissolving said N-acetyl aminophenol in water, acidifying the aqueous solution with sulfuric acid to a pH of from 1 to 2, heating the acidic solution to a temperature of from 85° C. to 95° C., filtering the hot acidic solution and slowly cooling the filtrate to a temperature of from about 0° C. to about 10° C. while slowly adding thereto at least about 0.05 part per 100 parts of N-acetyl aminophenol of sodium hydrosulfite as the N-acetyl aminophenol crystallizes from the solution, the foregoing steps being carried out in an atmosphere of sulfur dioxide.

13. The process of claim 11 wherein decolorizing carbon is added prior to the filtration step.

14. In the process for the purification of crude discolored N-acetyl aminophenol, having the amino and hydroxyl groups in position other than meta with respect to each other, obtained by reacting acetic anhydride with impure aminophenol containing products of oxidation of the aminophenol; the steps which comprise dissolving said crude discolored N-acetyl aminophenol in water, acidifying the aqueous solution with sulfuric acid to a pH of from about 1 to about 2, heating the acidic solution to a temperature of from 50° C. to 100° C., filtering the hot acidic solution, slowly cooling the filtrate while slowly adding thereto an alkaline reducing sulfite as the N-acetyl aminophenol crystallizes from the solution, recovering the crystallized N-acetyl aminophenol, redissolving the N-acetyl aminophenol in a minimum amount of water with heating, adjusting the pH of the resulting hot solution to a pH of not above 7 with an alkaline reducing sulfite, and cooling the resulting solution to recrystallize N-acetyl aminophenol therefrom, all of the foregoing steps being carried out in a non-oxidizing atmosphere.

15. In the process for the purification of crude discolored p(N-acetyl) aminophenol obtained by reacting acetic anhydride with impure aminophenol containing products of oxidation of the aminophenol; the steps which comprise dissolving said crude discolored p(N-acetyl) aminophenol in water, acidifying the aqueous solution with sulfuric acid to a pH of from about 1 to about 2, heating the acidic solution to a temperature of from 85° C. to 95° C., dissolving a small amount, at least about 0.05 part per 100 parts by weight of N-acetyl aminophenol, of sulfur dioxide in said solution, filtering the hot acidic solution, slowly cooling to about 0° to 10° C. the filtrate while slowly adding thereto at least about 0.05 part per 100 parts by weight of N-acetyl aminophenol of sodium hydrosulfite as the p(N-acetyl) aminophenol crystallizes from the solution recovering the crystallized p(N-acetyl) aminophenol, redissolving the p(N-acetyl) aminophenol in a minimum amount of water with heating, adjusting the pH of the resulting hot solution to a pH of not above 7 with an alkaline reducing sulfite and cooling to about 5° C. the resulting solution to recrystallize p(N-acetyl) aminophenol therefrom, the foregoing steps being carried out in a nonoxidizing atmosphere.

16. The process of claim 15 wherein the nonoxidizing atmosphere is provided by carbon dioxide.

17. In the process for the purification of crude discolored p(N-acetyl) aminophenol obtained by reacting acetic anhydride with impure aminophenol containing products of oxidation of the aminophenol; the steps which comprise dissolving said crude discolored p(N-acetyl) aminophenol in water, acidifying the aqueous solution with sulfuric acid to a pH of from about 1 to about 2, heating the acidic solution to a temperature of from 85° C. to 95° C., filtering the hot acidic solution, slowly cooling to about 0° to 10° C. the filtrate while slowly adding thereto at least about 0.05 part per 100 parts by weight of N-acetyl aminophenol of sodium hydrosulfite as the p(N-acetyl) aminophenol crystallizes from the solution recovering the crystallized p(N-acetyl) aminophenol, redissolving the p(N-acetyl) aminophenol in a minimum amount of water with heating, adjusting the pH of the resulting hot solution to a pH of not above 7 with an alkaline reducing sulfite and cooling to about 5° C. the resulting solution to recrystallize p(N-acetyl) aminophenol therefrom, the foregoing steps being carried out in a non-oxidizing atmosphere.

References Cited in the file of this patent
UNITED STATES PATENTS

| | | |
|---|---|---|
| 1,401,937 | Bailey | Dec. 27, 1921 |
| 1,497,252 | Theimer | June 19, 1924 |
| 1,878,969 | Mills | Sept. 20, 1932 |
| 2,040,183 | Ostromislensky | May 12, 1936 |
| 2,394,572 | Utermohlen | Feb. 12, 1946 |
| 2,799,692 | Croxall et al. | July 16, 1957 |